United States Patent
Patalak et al.

(10) Patent No.: US 9,827,886 B2
(45) Date of Patent: Nov. 28, 2017

(54) DEFORMABLE SEAT BRACKET

(71) Applicant: NATIONAL ASSOCIATION FOR STOCK CAR AUTO RACING, INC., Daytona Beach, FL (US)

(72) Inventors: John Patalak, Concord, NC (US); Thomas Gideon, Concord, NC (US)

(73) Assignee: National Association for Stock Car Auto Racing, Inc., Daytona Beach, FL (US)

( * ) Notice: Subject to any disclaimer, the term of this patent is extended or adjusted under 35 U.S.C. 154(b) by 453 days.

(21) Appl. No.: 14/574,718

(22) Filed: Dec. 18, 2014

(65) Prior Publication Data

US 2016/0176321 A1    Jun. 23, 2016

(51) Int. Cl.
*B60N 2/427* (2006.01)
*B60N 2/42* (2006.01)
*B60N 2/015* (2006.01)
*B62D 23/00* (2006.01)

(52) U.S. Cl.
CPC ......... *B60N 2/42709* (2013.01); *B60N 2/015* (2013.01); *B60N 2/4235* (2013.01); *B60N 2/42736* (2013.01); *B62D 23/005* (2013.01)

(58) Field of Classification Search
CPC ......... B60N 2/005; B60N 2/015; B60N 2/24; B60N 2/42; B60N 2/4207; B60N 2/4235; B60N 2/42709; B60N 2/42736
USPC .................................................. 296/63, 68.1
See application file for complete search history.

(56) References Cited

U.S. PATENT DOCUMENTS

2015/0274045 A1*  10/2015  Riley ................... B60N 2/4235
                                                                    297/344.1
2016/0009200 A1*   1/2016  Katoh ...................... B60N 2/10
                                                                     296/68.1

FOREIGN PATENT DOCUMENTS

JP           01164634 A  *  6/1989

OTHER PUBLICATIONS

English translation of JP 01-164634; retreived on Jul. 19, 2017 from the Japan Platform for Patent Information located at https://www.j-platpat.inpit.go.jp/web/all/top/BTmTopEnglishPage.*

* cited by examiner

*Primary Examiner* — Jason S Daniels
(74) *Attorney, Agent, or Firm* — Alston & Bird LLP

(57) ABSTRACT

A system for securing a seat within a vehicle may include a seat bracket with a first portion configured to be attached to a structural frame of a vehicle by a first fastener passing there through, a second portion configured to be attached to a seat installed in the vehicle by a second fastener passing there through, and a third portion attaching the first portion to the second portion. The third portion may include a U-shaped bend, and the first portion may be configured to receive the second fastener there through. The second portion may include a hole for the second fastener to pass through, and the first portion may include a hole for the second fastener to pass through. The first portion may define a fracture propagation region disposed proximate the hole for the second fastener.

18 Claims, 11 Drawing Sheets

DEFORMABLE SEAT BRACKET

TECHNOLOGICAL FIELD

The present invention relates to a system for securing a seat within a vehicle, and more particularly, to a system for securing a seat where the seat is permitted to move, by virtue of one or more seat brackets deforming, in response to the vehicle experiencing an acceleration above a predefined amount in a particular direction.

BACKGROUND

Safety is a concern for passengers of vehicles. From structural enhancements to a vehicle's frame or body to components within a vehicle to limit passenger movement, improvement of vehicle passenger safety has been and remains an on-going process.

Vehicle safety has generally been improved by keeping passengers securely seated within a passenger compartment within a vehicle and minimizing intrusion of foreign objects into, or deformation of, the passenger compartment. Vehicle components between the passenger compartment and the perimeter of the vehicle (e.g., the trunk, doors, engine bay, etc.) have been designed to absorb impact and to minimize the magnitude of forces experienced by passengers within a vehicle during an impact. Safety within the passenger compartment has been enhanced with features to more gradually reduce a passenger's momentum by extending the time over which a passenger experiences an impact. Features such as seat belts and air bags are designed to cushion a passenger's deceleration during an impact to prevent jarring, abrupt accelerations experienced by the passenger's body.

Conventionally, safety developments have focused on keeping the passenger securely retained in a seat within the vehicle, and keeping the seat fixed in position within the vehicle. In this manner, the safety features surrounding the occupants can be optimized for the safety of an occupant in a known, substantially fixed position.

In extreme circumstances, the passenger compartment of a vehicle may be deformed or compromised by a foreign object, such as another vehicle, a barrier, etc. In such circumstances, additional safety features may be desirable to increase the safety of a passenger and to reduce potential injury to the passenger(s).

BRIEF SUMMARY

Various embodiments of the present invention are directed to a system for securing a seat within a vehicle, and more particularly, to a system for securing a seat where the seat is permitted to move, by virtue of one or more seat brackets deforming, in response to the vehicle experiencing an acceleration above a predefined amount in a particular direction.

A seat bracket according to example embodiments may include a first portion configured to be attached to a structural frame of a vehicle by a first fastener passing therethrough, a second portion configured to be attached to a seat installed in the vehicle by a second fastener passing therethrough, and a third portion attaching the first portion to the second portion. The third portion may include a U-shaped bend, and the first portion may be configured to receive the second fastener therethrough. The second portion may include a hole for the second fastener to pass through, and the first portion may include a hole for the second fastener to pass through. The first portion may define a fracture propagation region disposed proximate the hole for the second fastener. The bracket may be configured to preclude relative motion between the first portion and the second portion in response to a force exerted on the seat along an axis axially aligned with a first axis of the first fastener, perpendicular to a hole in the first portion for the first fastener; preclude relative motion between the first portion and the second portion in response to a force exerted on the seat along an axis axially aligned with a second axis of the second fastener, orthogonal to the holes for the second fastener; preclude relative motion between the first portion and the second portion in response to a force exerted on the seat in a first direction along a third axis perpendicular to the first axis and the second axis; and allow relative motion between the first portion and the second portion in response to a force exerted on the seat above a predefined amount in a second direction, opposite the first direction, along the third axis.

According to some embodiments, the bracket may further include a collar received through at least one of the hole of the second portion for the second fastener and the hole of the first portion for the second fastener. The second portion may be configured to move relative to the first portion toward the third portion in response to a force above a predefined amount. The second fastener may be configured to tear through the second portion in response to the second portion moving relative to the first portion toward the third portion. The bracket may be configured to allow relative motion between the first portion and the second portion in response to a force exerted on the seat above a predefined amount in a direction along an axis passing by the first portion and the second portion and through the center of the U-shape of the third portion distal from the first and second portions. The first portion, second portion, and third portion may be formed from a single piece of metal. The first portion may include a structural member configured to be attached to the structural frame and a second fastener receiving portion configured to receive the second fastener there through, where the structural member and the second fastener portion are attached to one another and bent orthogonally. The first portion may include a support portion connecting the structural member and the second fastener receiving portion.

Embodiments of the present invention may provide a seat bracket including a first portion configured to be attached to a structural frame of a vehicle by a first fastener passing there through, a second portion configured to be attached to a seat installed in the vehicle by a second fastener passing there through, and a third portion attaching the first portion and the second portion, where the third portion comprises a U-shape. The second portion may be configured to move relative to the first portion, in response to a force exerted on the seat above a predefined amount in a first direction along an axis that his perpendicular to a major axis of the first fastener and perpendicular to a major axis of the second fastener. The second portion may be configured to remain substantially stationary relative to the first portion in response to a force exerted on the seat above the predefined amount in a second direction, opposite the first direction. The first portion may be configured to be attached to the seat by the second fastener passing through the second portion and the first portion. The second fastener may be configured to tear through the first portion in response to the second portion moving relative to the first portion in response to the force exerted on the seat above a predefined amount in the first direction.

According to some embodiments, the bracket may include a fracture propagation region in the first portion disposed proximate a hole through the first portion into which the second fastener is received. The first portion may be configured to tear beginning at the fracture propagation region. The first portion may be configured to receive the first fastener through a first hole along a first axis, the second portion may be configured to receive the second fastener through a second hole along a second axis, and the first axis and the second axis may be perpendicular.

Embodiments of the present invention may provide a method of securing a seat within a vehicle, including enabling relative motion between a first portion of a seat bracket attached to a structural frame member of the vehicle and a second portion of the seat bracket attached to a seat within the vehicle in response to the seat experiencing a force along a first direction greater than a predetermined amount, where the first portion and the second portion are attached by a third portion. Enabling relative motion may include tearing a fracture propagation region of the first portion. The first portion may include a hole for receiving a fastener along a first fastening axis to attach the first portion to the structural frame member, where the second portion includes a hole for receiving a second fastener along a second fastening axis to attach the second portion to the seat within the vehicle, where the first fastening axis may be perpendicular to the second fastening axis, and where the first direction is perpendicular to the first fastening axis and the second fastening axis. Embodiments may provide for precluding relative motion between the first portion and the second portion in response to the vehicle experiencing a force exerted on the seat along a second direction, opposite the first direction, greater than the predetermined amount.

The aforementioned example embodiments are illustrative of implementations of the present invention; however, embodiments are not limited to those examples outlined above. Further description of various features and implementations of the example embodiments are described below in greater detail.

BRIEF DESCRIPTION OF SEVERAL VIEWS OF THE DRAWING(S)

Reference will now be made to the accompanying drawings, which are not necessarily drawn to scale, and wherein.

DETAILED DESCRIPTION

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in the example embodiments illustrated in the figures.

Various embodiments of the present invention provide a system for securing a seat within a vehicle in such a manner that the seat is permitted to move, by virtue of one or more seat brackets deforming, in response to the vehicle seat experiencing a force above a predefined amount in a particular direction. While embodiments of the present invention are described herein with respect to a racing vehicle with a safety cage, embodiments may be implemented in any appropriate setting, such as other racing craft (watercraft, aircraft, etc.) or vehicles not used for racing, such as passenger cars, sport-utility vehicles, trucks, tractor-trailers, watercraft, aircraft, spacecraft, etc. Further, while embodiments are described herein with reference to a vehicle and a "passenger" compartment within the vehicle, the "passenger" compartment encompasses the region in which occupants of the vehicle are positioned, such as the driver's seating area and any potential passenger's seating area within the vehicle. In some embodiments, even racing vehicles have multiple seats within the passenger compartment, such as in rally racing for a driver and navigator. Thus, the "passenger compartment" is understood to encompass the envelope in which occupants of a vehicle travel. The system for securing a seat within the vehicle may be applicable to any seat within the vehicle and is not limited to the driver's seat embodiment in the illustrated embodiments, as would be apparent to one of ordinary skill. According to example embodiments described herein, the "driver's side" of the vehicle is generally referenced as the left side of the vehicle, however, embodiments of the invention are equally applicable to either side of the vehicle by reversal such that embodiments may be implemented on passenger seats opposite the driver's side, or on driver's seats which are disposed on the other side of the passenger compartment.

Figure 1:
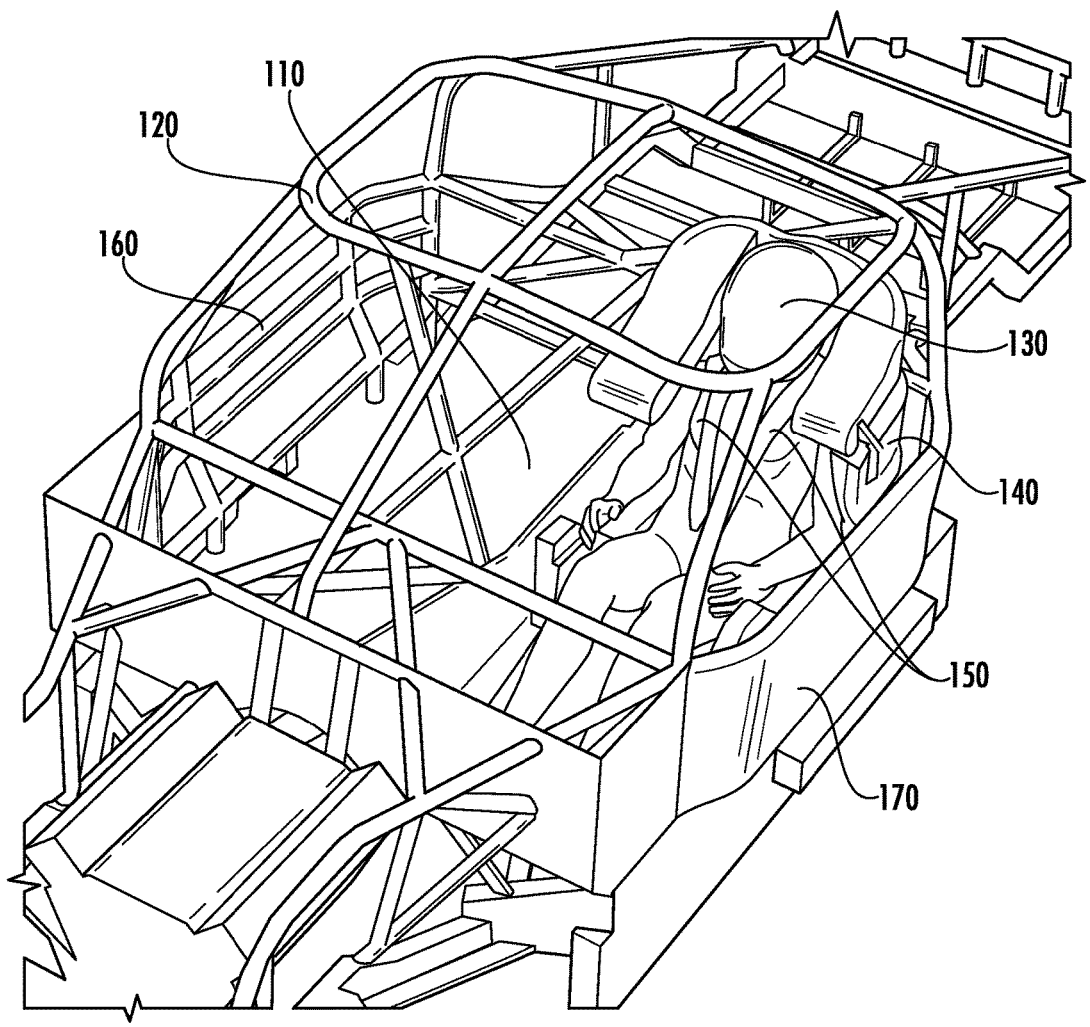
FIG. 1 is an illustration of a detail view of the inside of a vehicle including a safety cage, a passenger compartment, a driver, and a seat.

FIG. 1 illustrates an example embodiment of a passenger compartment 110 of a racing vehicle including a "safety cage" 120 comprising structural members that protect the passenger compartment. The illustrated passenger compartment 110 and safety cage 120 are generally surrounded by a vehicle body together with an engine and drivetrain. The vehicle body, engine, and drivetrain, as well as other elements of the vehicle, have been omitted for ease of understanding of embodiments of the present invention. As shown, the driver 130 is secured within the passenger compartment, into the driver's seat 140. The driver 130 is secured in position within the passenger compartment with a safety belt 150, which may include a plurality of belts generally secured by a latch proximate the driver. The safety belt 150 of some vehicles may be a 5-point or 6-point safety harness which includes first and second belts which meet at a latch to form a lap-belt, third and fourth belts which come over the driver's shoulders and meet at the latch to form two shoulder straps, and a fifth belt (and possibly sixth belt) which extends from between the driver's legs to the latch to form an "anti-submarine" belt. The safety belt is conventionally mounted securely to the structure of the vehicle, such as to the safety cage 120. If the seat 140 is securely mounted to the safety cage 120 and/or to the frame of the vehicle, and the seat is of a sufficiently rigid material, the safety belt 150 may be attached directly to the seat 140. The secure mounting of the seat 140 to the safety cage 120 serves to have a secure mount between the safety cage 120 and the safety belt 150, as required for maintaining the position of an occupant within seat 140 within the vehicle.

While illustrated embodiments depict a safety cage 120, embodiments may be implemented in vehicles lacking a full safety cage as shown, or even a partial safety cage. For example, a vehicle's body, such as a unibody vehicle, or a vehicle's frame may provide sufficient structure to which a seat and/or safety belt may be mounted, and may implement a deformable bracket according to example embodiments of the present invention.

During a crash or an impact, the safety cage 120 is configured to protect the passenger compartment 110 by minimizing intrusion of an object into the cage, such as another vehicle, and to resist deformation of the safety cage to preserve the integrity of the passenger compartment, thereby helping to keep the occupants safe. However, during some severe impacts, deformation of the safety cage 120 may occur causing intrusion of the safety cage and the impacted object into the original envelope of the passenger compartment 110. In such an impact, some degree of intrusion may be acceptable in dependence of the direction and the distance of the intrusion from the occupants of the passenger compartment. For example, in a racecar with only a driver, as shown in FIG. 1, intrusion into the passenger compartment from the side opposite the driver, through the side 160 of the safety cage, may be more acceptable, to a degree, than intrusion into the passenger compartment through the driver's side 170 of the safety cage 120.

During an impact in which an object intrudes into, or deforms the side 160 of the safety cage 120 into the passenger compartment, it may be desirable for the seat 140 to remain securely fastened to the safety cage 120 of the vehicle in the embodiment of FIG. 1. Similarly, in a frontal impact or rear impact, where the driver's side 170 of the safety cage 120 remains structurally in-tact and does not intrude into the original envelope of the passenger compartment, it may be desirable for the seat 140 to remain securely attached to the safety frame 120 and remain in place during the impact. Keeping the seat 140 securely fastened in place during the aforementioned impacts may enable the driver to get the maximum benefit from the safety features designed into the seat 140, the safety belt 150, and any other safety features which depend on proper positioning of the driver, such as a head-and-neck-safety devices or HANS® device. These safety features, together with the secure mounting of the seat 140 to the safety cage 120 (or other vehicle structure), help to maximize the safety of the driver.

However, in some instances, an impact may involve an object intruding into, or deforming the driver's side 170 of the safety cage 120. As the driver is seated close to the driver's side 170 of the safety cage, intrusion into or deformation of the driver's side 170 of the safety cage 120 can pose a safety risk for a driver. In such an impact, it may be desirable to enable the seat 140 to be moved from the original position within the passenger compartment 110 to move the driver and the seat away from the impacted side of the vehicle.

Provided herein is a mechanism by which a seat 140 may be securely mounted within a vehicle, such as to a safety cage 120, where the seat 140 may resist movement during frontal impacts, rear impacts, impacts from a first side, and rollover impacts, but which may allow movement of the seat in a controlled path during an impact from a second side of the vehicle, where a force on the seat exceeds a predefined amount.

Figure 2:
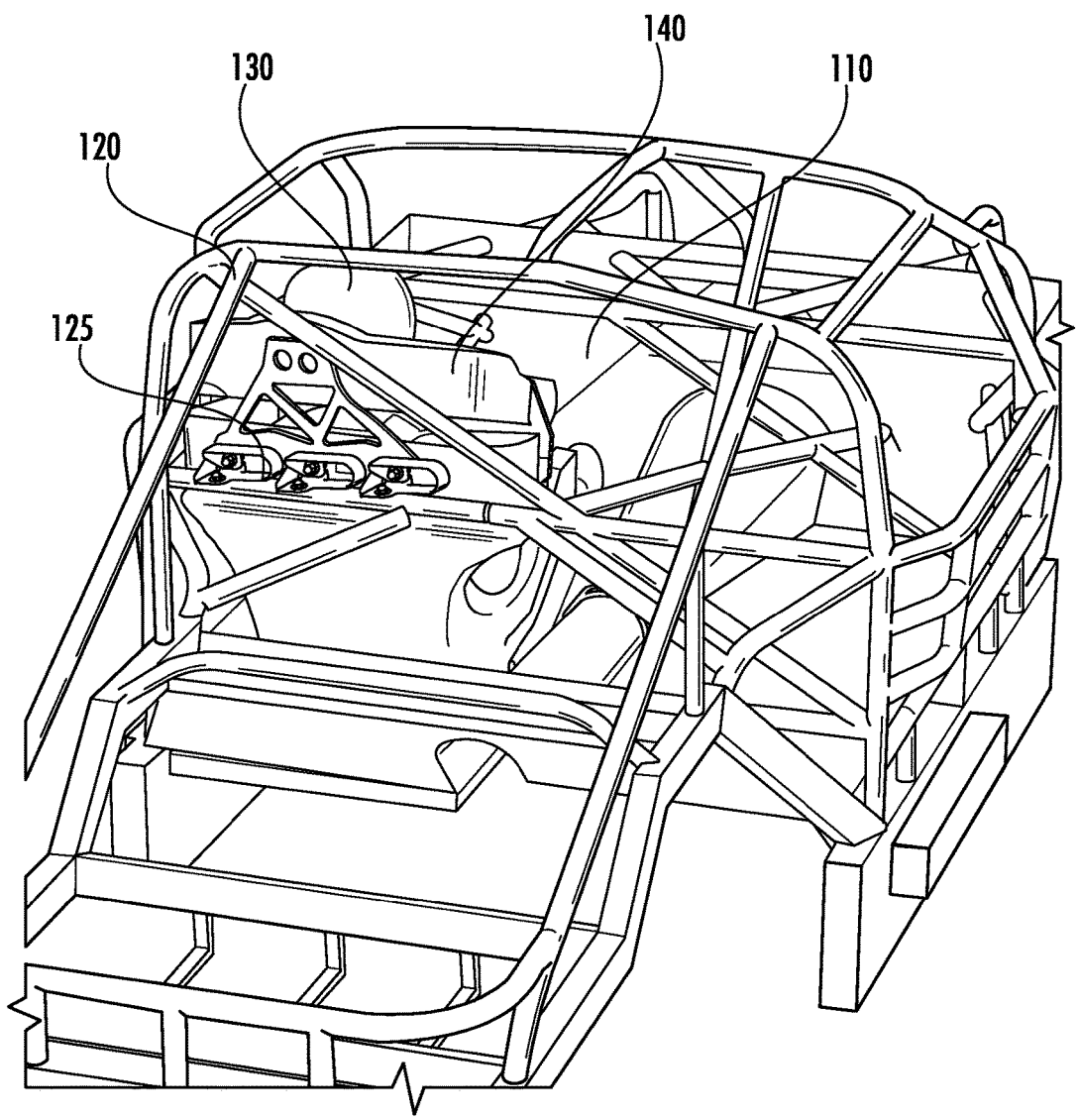
FIG. 2 illustrates a detail view of the vehicle of FIG. 1 as viewed from behind the driver including deformable brackets attaching the seat to the safety cage according to an example embodiment of the present invention.
Figure 3:
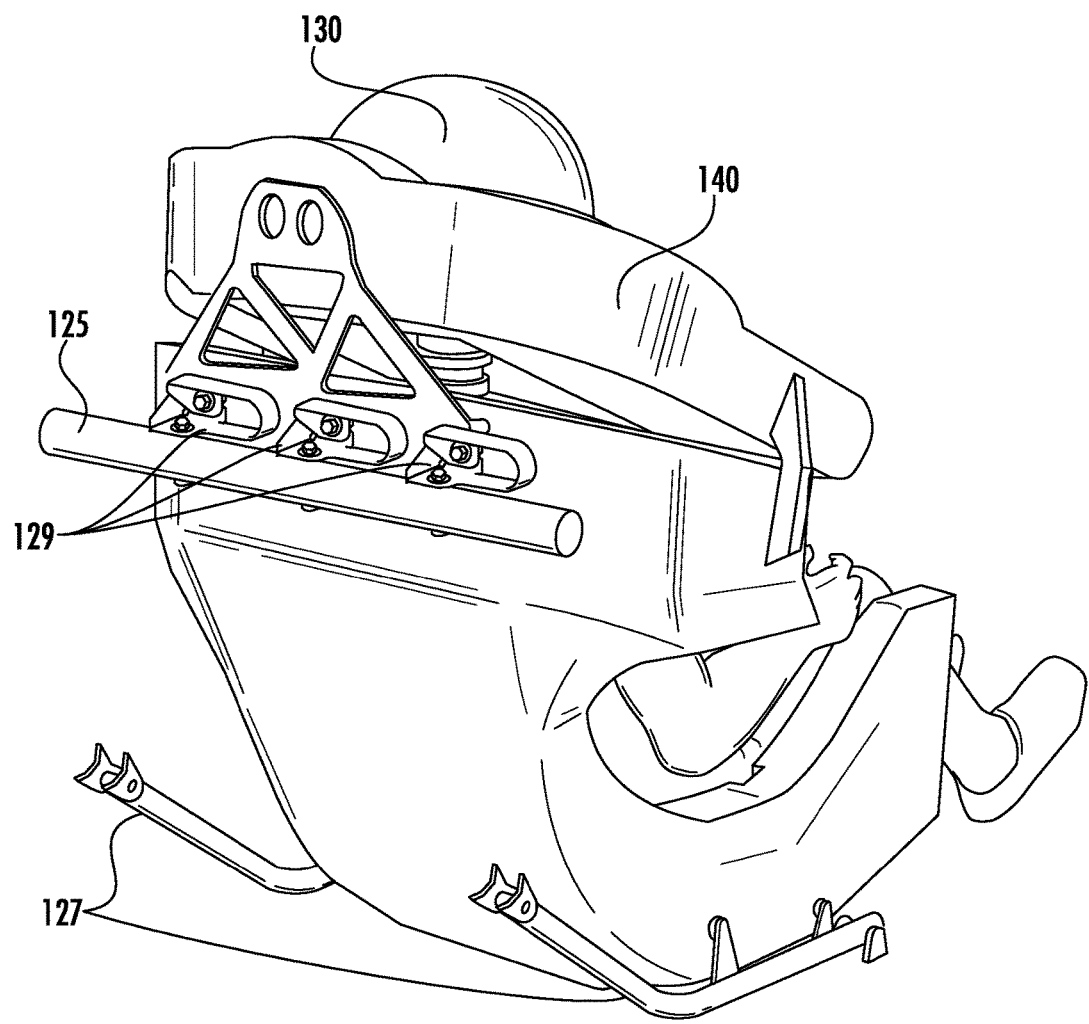
FIG. 3 illustrates a detail view of the seat and a portion of the safety cage with the deformable brackets of an example embodiment of the present invention.

FIG. 2 illustrates the vehicle safety cage 120 of FIG. 1 defining the passenger compartment 110 in which the driver 130 and driver's seat 140 are secured. According to the illustrated embodiment, the safety belt 150 is secured to the seat 140 and the seat is secured to the safety cage 120. As illustrated, the seat 140 is secured at the back of the seat to cross-member 125. FIG. 3 illustrates the seat 140, cross member 125 of the safety cage 120, and lower members 127 of the safety cage 120, while omitting the remainder of the safety cage for ease of understanding. It is appreciated that the cross member 125 and lower members 127 are securely tied into the safety cage 120 in practice in the illustrated embodiment.

The cross member 125 of FIG. 3 is secured to the seat 140 via three seat brackets 129. The seat 140 is also attached to the safety cage by lower members 127 on either side of the bottom of the seat 140. The three seat brackets 129 are each mounted by a first fastener to the cross member 125, and by a second fastener to the seat 140. The seat brackets 129 may be mounted directly to the seat 140 by the second fastener, or the seat brackets 129 may be mounted by the second fastener to a structural member of the seat that is a rigid part of the seat 140. While the illustrated embodiment includes three seat brackets 129, embodiments may include as few as one seat bracket or as many seat brackets as are needed to effect the functionality described herein.

Figure 4:
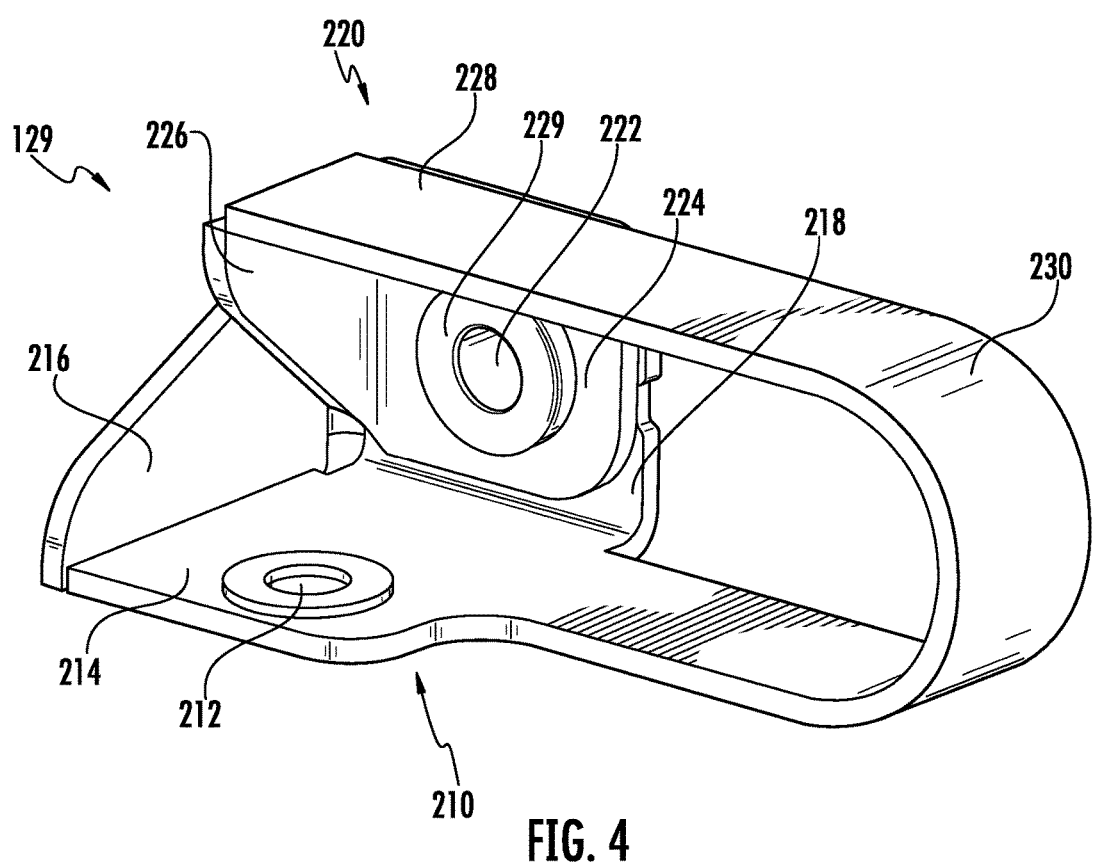
FIG. 4 illustrates a perspective view of a deformable seat bracket according to an example embodiment of the present invention.

FIG. 4 illustrates one of the seat brackets 129 of FIG. 3 shown removed from the cross member 125 and the seat 140. The seat bracket 129 includes a first portion 210, a second portion 220, and a third portion 230, that connects the first portion and the second portion. The first portion 210 includes a hole 212 through which a first fastener (not shown) is configured to be received to attach the first portion 210 to the cross member 125 of the illustrated embodiment of FIG. 3. The fastener, which may include a bolt or stud, may have a major axis along which the fastener is received into the hole 212 through the first portion 210. The hole 212 may, in some embodiments, be reinforced with a collar. The second portion 220 may also include a hole 222 through which a second fastener (not shown) may be received. The second fastener may also be a bolt or stud having a major axis along which the fastener is inserted into the hole 222 in the second portion 220. The hole 222 through which the second fastener may be received may also receive therein a collar 229 to provide additional reinforcement of the hole 222. The first portion 210 and the second portion 220 of the illustrated embodiment are attached to one another by a U-shaped third portion 230 which extends from the first portion 210 to the second portion 220.

According to the illustrated embodiment, the first portion 210 may comprise a first structural member 214 that defines the first hole 212, a second fastener receiving portion 218 defining a hole through which the second fastener is received, as will be illustrated and further described below, and a support portion 216 configured to be attached between the first structural member 214 and the second fastener receiving portion 218. The structural member 214, the second fastener receiving portion 218, and the support portion 216, may each define planes that are substantially orthogonal to one another as shown in FIG. 4. Further, each of the structural member 214, the second fastener receiving portion 218, and the support portion 216, may be attached to the other two of the structural member 214, the second fastener receiving portion 218, and the support portion 216 along a respective edge. The attachment between the structural member 214, the second fastener receiving portion 218, and the support portion 216 edges may be by a weld or by a bend between the respective portions.

Similarly, the second portion 220 may include a second structural member 224 which defines the hole 222 through which the second fastener is received in the second portion 220. The second portion 220 may also include a lateral portion 228 and a second support portion 226 which is configured to be attached between the second structural member 224 and the lateral portion 228. The second structural member 224, the second support portion 226, and the lateral portion 228, may each define planes that are substantially orthogonal to one another. The plane defined by the lateral portion 228 may be parallel to the plane defined by the first structural member 214, the plane defined by the second structural member 224 may be parallel to the plane defined by the second fastener receiving portion 218, and the plane defined by the support portion 216 may be parallel to the plane defined by the second support portion 226. Further, each of the second structural member 224, the lateral portion 228, and the second support portion 226, may be attached to the other two of the second structural member 224, the lateral portion 228, and the second support portion 226 along a respective edge. The attachment between the second structural member 224, the lateral portion 228, and the second support portion 226 edges may be by a weld or by a bend between the respective portions. As shown, the third portion 230 may be attached between the first structural member 214 and the lateral portion 228 and may define a U-shape.

Figure 5:
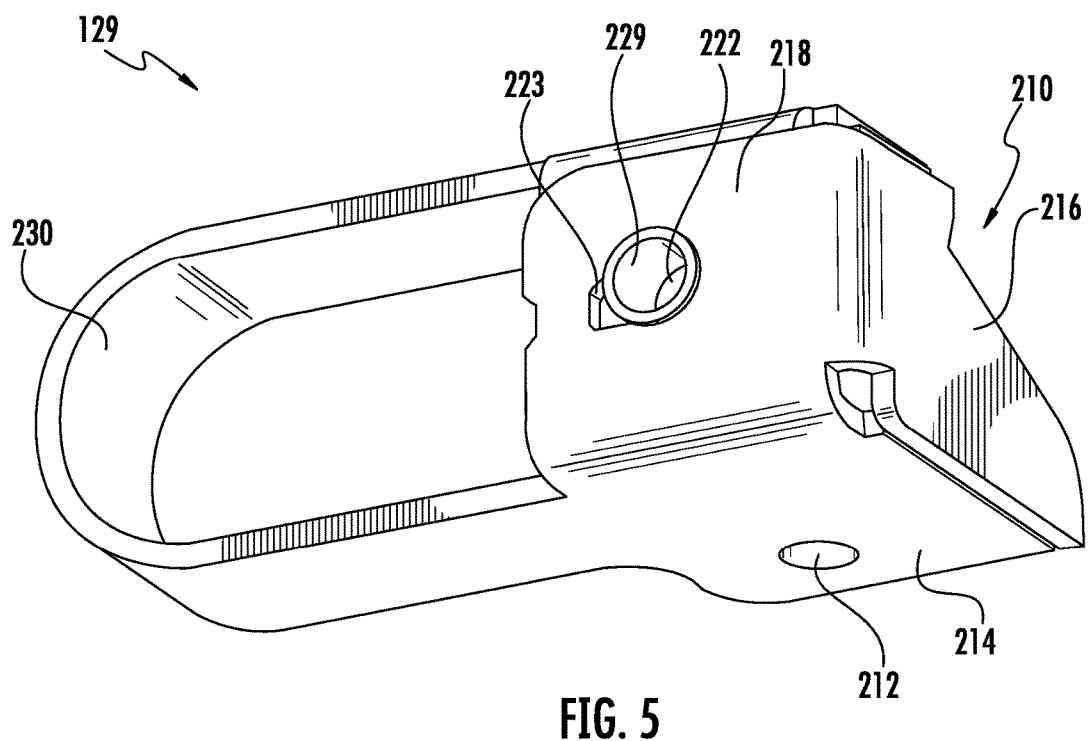
FIG. 5 illustrates another perspective view of the deformable seat bracket of FIG. 4.

FIG. 5 illustrates another view of the bracket 129 of FIG. 4 depicting the face of the first structural member 214 that engages the cross member 125, and the face of the second fastener receiving portion 218 of the first portion 210 that engages the seat 140, or a bracket connected thereto. As shown, the second fastener receiving portion 218 may include a fracture propagation region 223, which in the illustrated embodiment is a recess adjacent to the hole 222. This fracture propagation region 223 may be configured to facilitate the initiation of a fracture or tear through the second fastener receiving portion 218 of the first portion 210 by the fastener received through the hole 222 of the second structural member 224 and the second fastener receiving portion 218, as described further below. The fracture propagation region may be of a shape that encourages a fracture to occur through the second fastener receiving portion 218 proximate the fracture propagation region 223.

Figure 6:
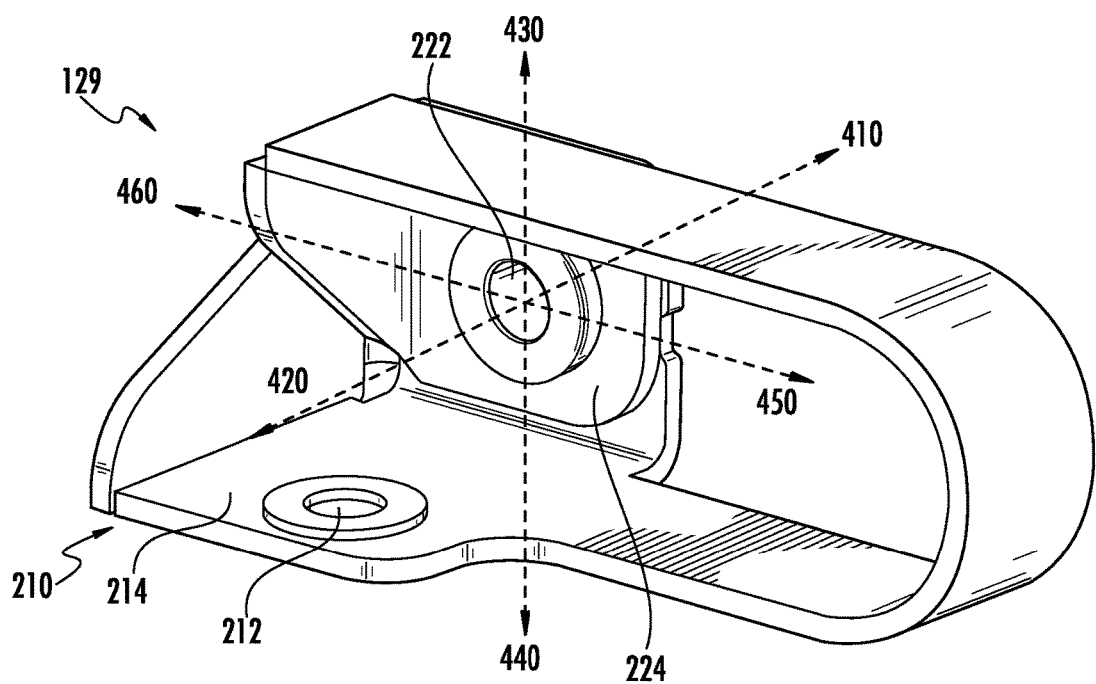
FIG. 6 illustrates a perspective view of the deformable bracket of FIGS. 4 and 5 according to an example embodiment of the present invention shown with directional force illustrations.

FIG. 6 illustrates the seat bracket of FIG. 4. While only a single seat bracket is illustrated, one or more seat brackets can be used together and sized as needed for various embodiments. In the case of multiple seat brackets, each seat bracket is attached to the safety cage 120 and to the seat 140 in such a way that all of the seat brackets 129 used may experience substantially the same forces at the same time.

In the installed position, bracket 129 includes the hole 212 defined by the first structural member 214 of the first portion 210 that is configured to be held substantially stationary relative to the structural member (125 of FIG. 3) to which the first portion 210 is attached in response to a force being exerted on the seat 140, which is attached to the bracket 129 by a fastener passing through hole 222 defined through the second structural member 224.

During a frontal impact, where the front of a vehicle which the driver is facing impacts an object causing substantial deceleration, a force is exerted on the seat by the occupant. While the vehicle abruptly decelerates, the momentum of the driver continues in the forward direction. As the driver 130 is held to the seat 140 by the safety belt 150 that is attached to the seat, as shown in FIGS. 1 and 2, the momentum of the driver results in a force applied through the seat to the bracket attaching the seat to the safety frame 120 crossbar 125. This force is transmitted from the seat to the bracket 129 by the fastener received through hole 222 of the bracket. This results in a force along the direction of arrow 410 of FIG. 6, along the major axis of the fastener received through hole 222. Similarly, an impact in the opposite direction, such as a "rear end" impact where the back end of the vehicle is struck or strikes an object, the impact may cause an abrupt deceleration in the direction opposite that of the frontal impact. This results in a force exerted on the seat which translates to a force seen at the bracket 129 in the direction of arrow 420, opposite that of arrow 410. In the event of a frontal impact or a rear-end impact, the bracket 129 is configured to resist movement and to resist deformation, keeping the seat securely positioned within the passenger compartment. In such an impact, the first portion 210 and the second portion 220 of the bracket 129 are configured to remain substantially stationary with respect to one another, thereby maintaining the seat where it attached to the bracket 129 in a substantially stationary position.

Some vehicle accidents may involve a vehicle that is launched airborne by the force of the accident and/or by an object causing the vehicle to lift or roll. Such an accident may result in a roll-over impact or an impact in which the vehicle lands on the roof, or the roof of the vehicle impacts an object, such as a retaining wall. In such an impact, the driver, who is secured to the seat, causes a force on the seat toward the roof of the vehicle. This force is translated through the seat into the seat bracket 129 by the fastener received through hole 222, and creates a force in the direction of arrow 430 at hole 222. Similarly, if a vehicle experiences an impact in which the bottom of the vehicle strikes an object, or lands back on the ground with a force, a force is exerted on the seat in a direction toward the floor of the vehicle, resulting in a force seen at the seat bracket 129 in a direction along arrow 440 at hole 222. In the event of an impact on the roof or on the floor of the vehicle, the seat bracket 129 is configured to resist movement and to resist deformation, keeping the seat securely positioned within the passenger compartment. In such an impact, the first portion 210 and the second portion 220 of the seat bracket 129 are configured to remain substantially stationary with respect to one another, thereby maintaining the seat where it attached to the seat bracket 129 in a substantially stationary position.

In the event of a vehicle side impact, where the right side of the vehicle opposite a left driver's side impacts an object or is struck by an object, such as another vehicle, a force may be exerted on the seat in the direction of arrow 450 by the momentum of the driver. While this force is in the direction of arrow 450, the seat bracket 129, or brackets when more than one seat bracket is used, are configured to resist deformation and movement of the seat relative to the safety cage as the momentum of the driver will not exert a force above a predefined amount that would cause the seat bracket 129 to deform, as described further below.

During a vehicle side impact where a left driver's side of the vehicle is impacted, the momentum of the driver will cause a force to be exerted on the seat and on the seat bracket 129 in the direction of arrow 460. The seat bracket 129 is configured to resist or preclude deformation in this direction such that movement between the seat and the safety cage, in the direction of arrow 460 is not permitted. However, in the event of a vehicle impact on the driver's side where the safety cage (side 170 of FIG. 1) is compromised, and the safety cage is pushed into the area of the passenger compartment that the driver is occupying, the force of the safety cage and/or the object intruding into the passenger compartment produce a force on the seat 140 and on the seat bracket 129 in the direction of arrow 450. A force sufficient to compromise the safety cage 120 of FIGS. 1 and 2 by pushing the safety cage into the space occupied by the driver and driver's seat may produce a force on the seat 140 above a predefined amount such that the force exerted on the seat bracket 129 by the fastener attached to the seat 140 through hole 222 causes deformation of the seat bracket 129. Deformation in the direction of arrow 450 in response to a force on the seat in excess of a predefined amount is configured to be a controlled deformation of the seat bracket 129, where the second portion 220 moves relative to the first portion 210.

Figure 7A:
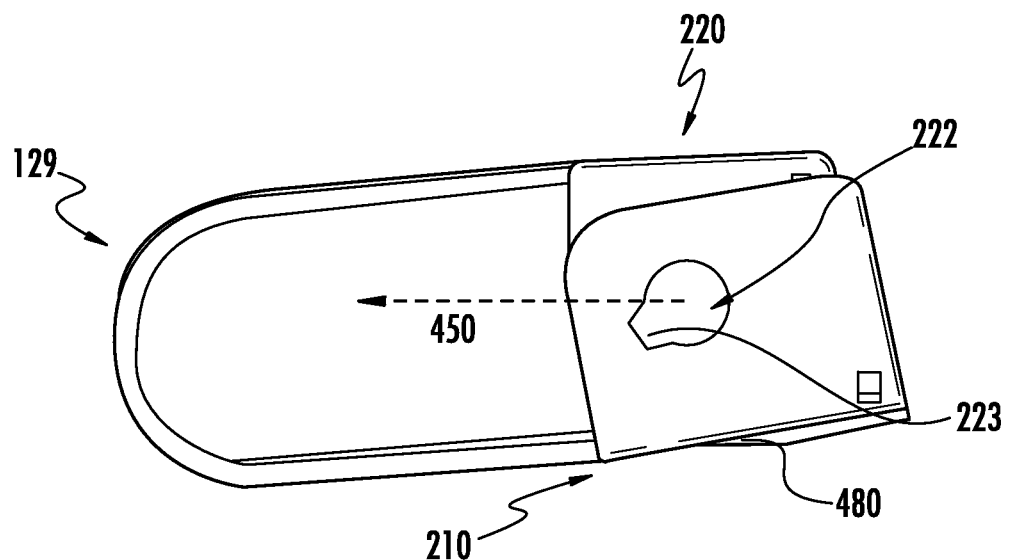
FIGS. 7A-7E illustrate a deformable seat bracket according to an example embodiment of the present invention as it is deformed through the application of a force to the bracket.
Figure 7B:
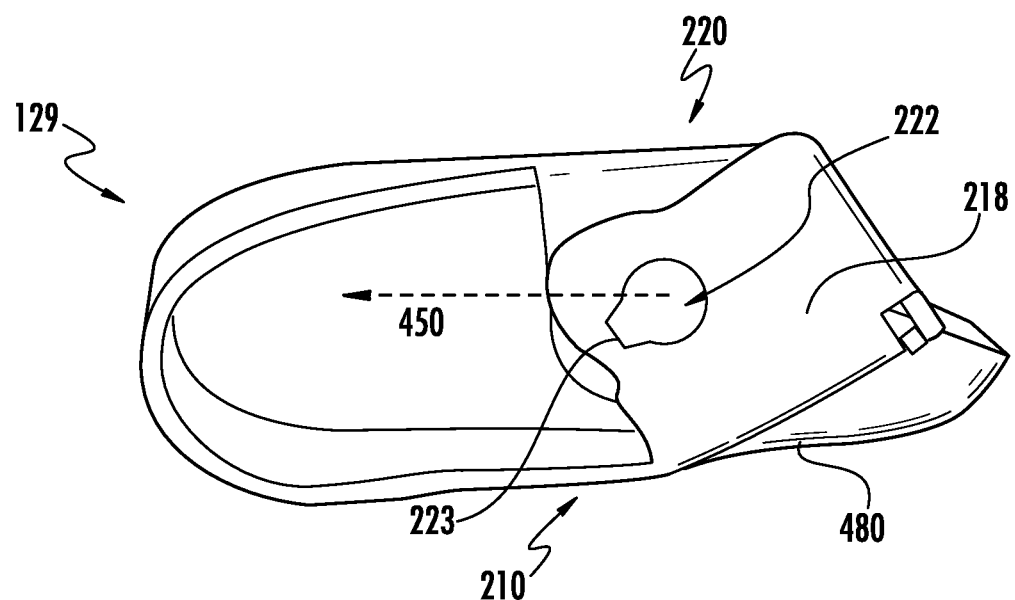

FIG. 7A illustrates a seat bracket 129 with a force being applied at the hole 222 in the direction of arrow 450. The seat bracket 129 of FIG. 7A is shown as viewed from the position of the seat, opposite the side shown in FIG. 6. The force being applied at hole 222 is generally applied by a fastener that secures the seat (not shown) to the bracket, such that when the seat experiences a force, the force is transmitted to the seat bracket 129. As shown in FIG. 7A, as the force along arrow 450 that exceeds a predefined amount is applied, the seat bracket 129 begins to deform. The first portion 210 of the seat bracket is held in place on the safety frame at 480 by the fastener (not shown) received through the first hole 212 of the first structural member 214. FIG. 7B illustrates the bracket of FIG. 7A with the force continuing to be applied and the bracket deforming further. In the illustrated embodiment of FIG. 7B, the deformation continues with the second portion 220 moving relative to the first portion 210 and as the hole in the second fastener receiving portion 218 is deformed along the path of the fracture propagation region 223.

Figure 7C:
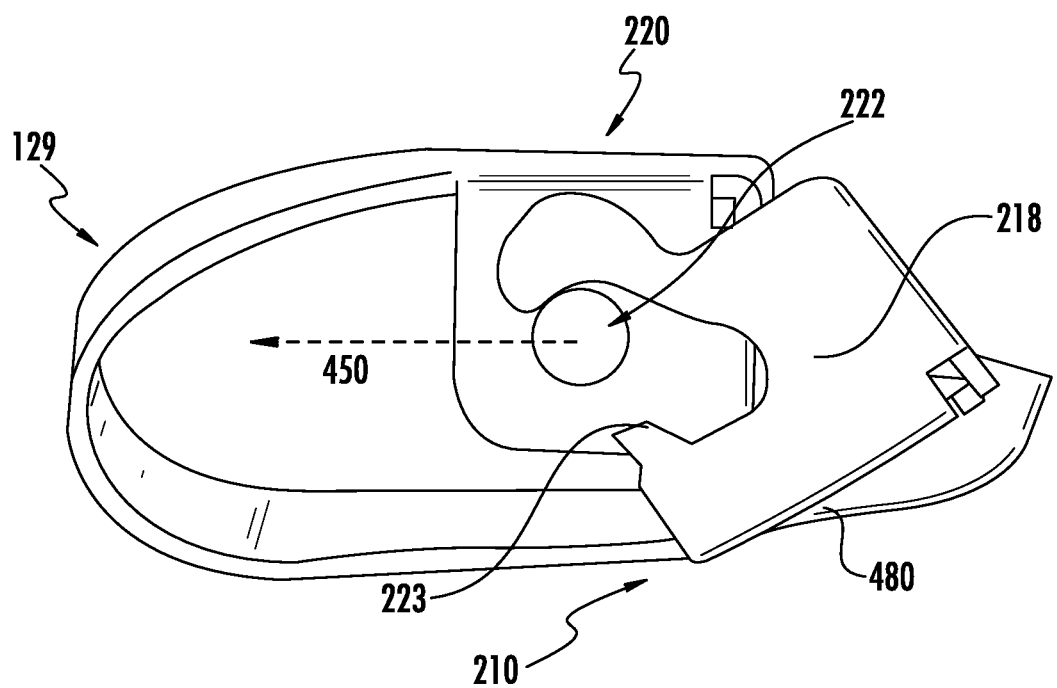

FIG. 7C illustrates the seat bracket 129 with the force at hole 222 in the second portion 220 continuing to be applied along arrow 450. As illustrated, the deformation of the bracket is exacerbated as the fastener (not shown) received through hole 222 continues to advance in the direction of arrow 450 and the second fastener receiving portion 218 of the first portion 210 is torn along a direction provided by the fracture propagation region 223. The fastener remains held in hole 222, possibly including a collar, and the fastener remains securely attached to the seat. Thus, as the fastener, the hole 222, and the second portion 220 of the bracket are moved relative to the first portion 210, the seat is permitted to advance in the direction of arrow 450.

Figure 7D:
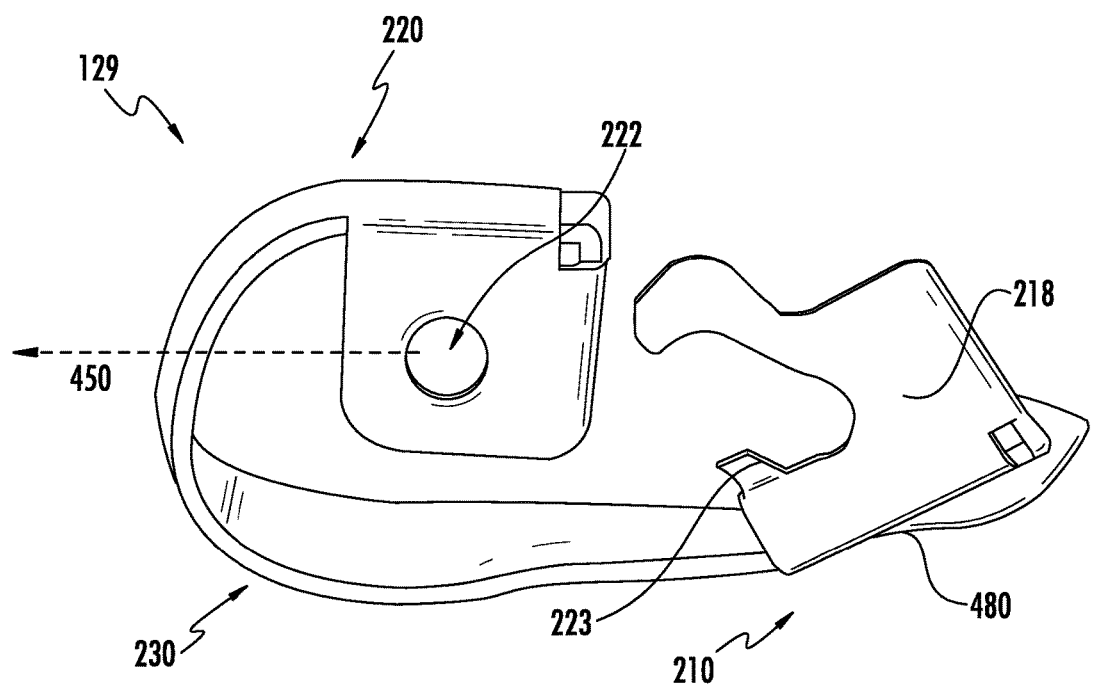

FIG. 7D illustrates the bracket 129 with the force at hole 222 in the second portion 220 continuing to be applied along arrow 450. In the illustrated embodiment, the fastener (not shown) received through hole 222 and attached to the seat (not shown) has torn through the hole in the second fastener receiving portion 218 of the first portion 210 beginning at the fracture propagation region 223. The first portion 210, despite some degree of deformation, remains affixed to the cross bar (element 125 of FIG. 3) at 480 while the second portion 220 moves relative to the first portion. The third portion 230 controls the motion and extend of displacement of the second portion 220 after the fastener of hole 222 has torn through and is free of the first portion 210. The third portion 230 prevents the seat from being torn free of the cross bar completely and maintains control over the seat position as the bracket 129 is deformed.

Figure 7E:
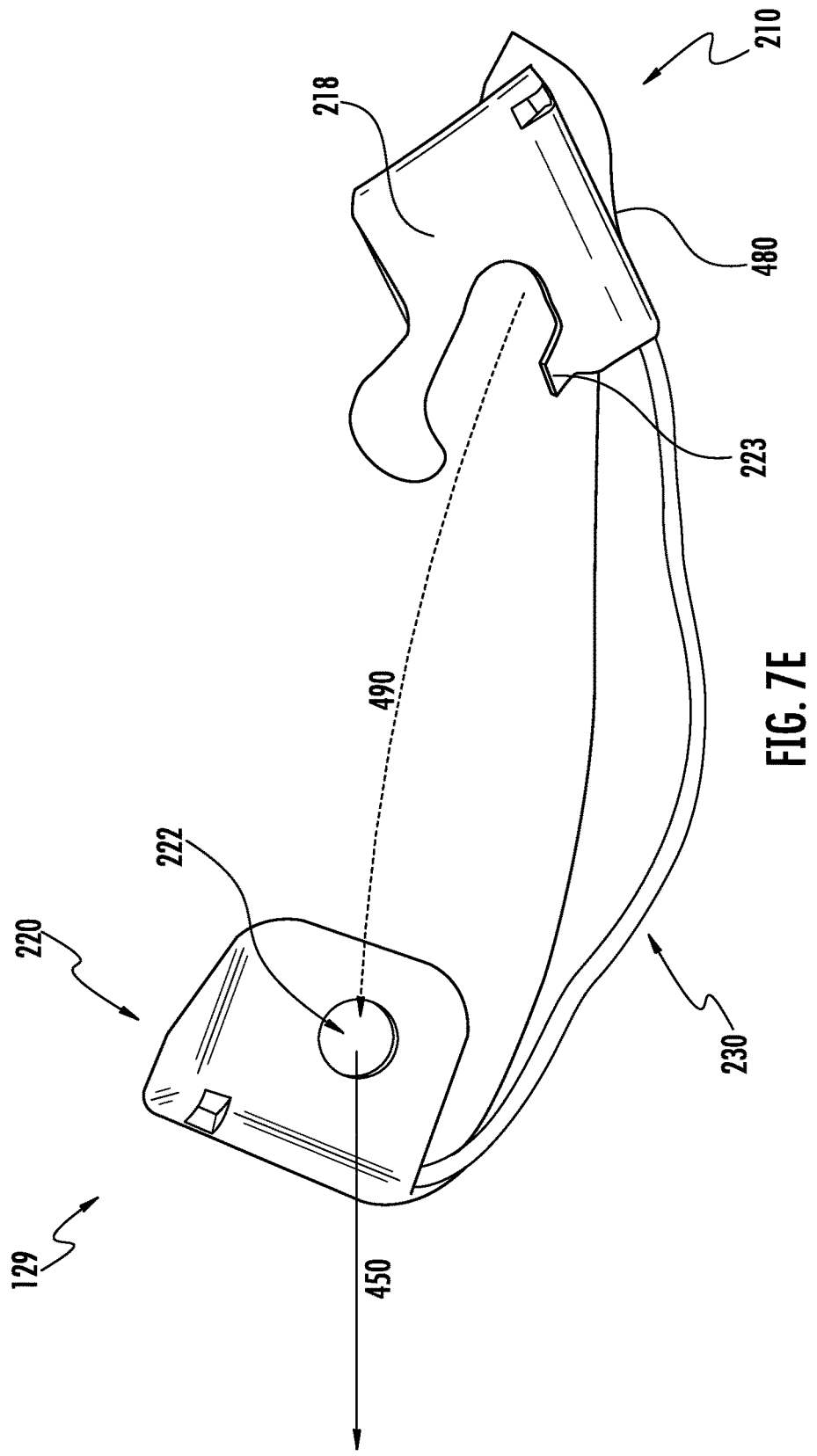

FIG. 7E illustrates the bracket 129 further deformed as the force at hole 222 exerted by the seat and fastener in the direction of arrow 450 continues. The path of the seat where the fastener through hole 222 attaches to the seat is illustrated through dashed line 490, illustrating how the seat, particularly the upper portion of the seat that is attached to the cross bar (125 of FIG. 3) of the safety cage (120 of FIG. 2) is enabled to move in a controlled manner from the original position to a position away from the driver's side of the safety cage as a force is applied to the seat in excess of a predefined amount. This controlled movement advances the driver and driver's seat away from the compromised safety cage and/or an object protruding through the safety cage displacing the driver's seat. The controlled movement of the seat further enables the safety equipment, such as the safety belt, the seat padding, and a HANS® device to continue to function appropriately to minimize injury to the driver.

Figure 8:
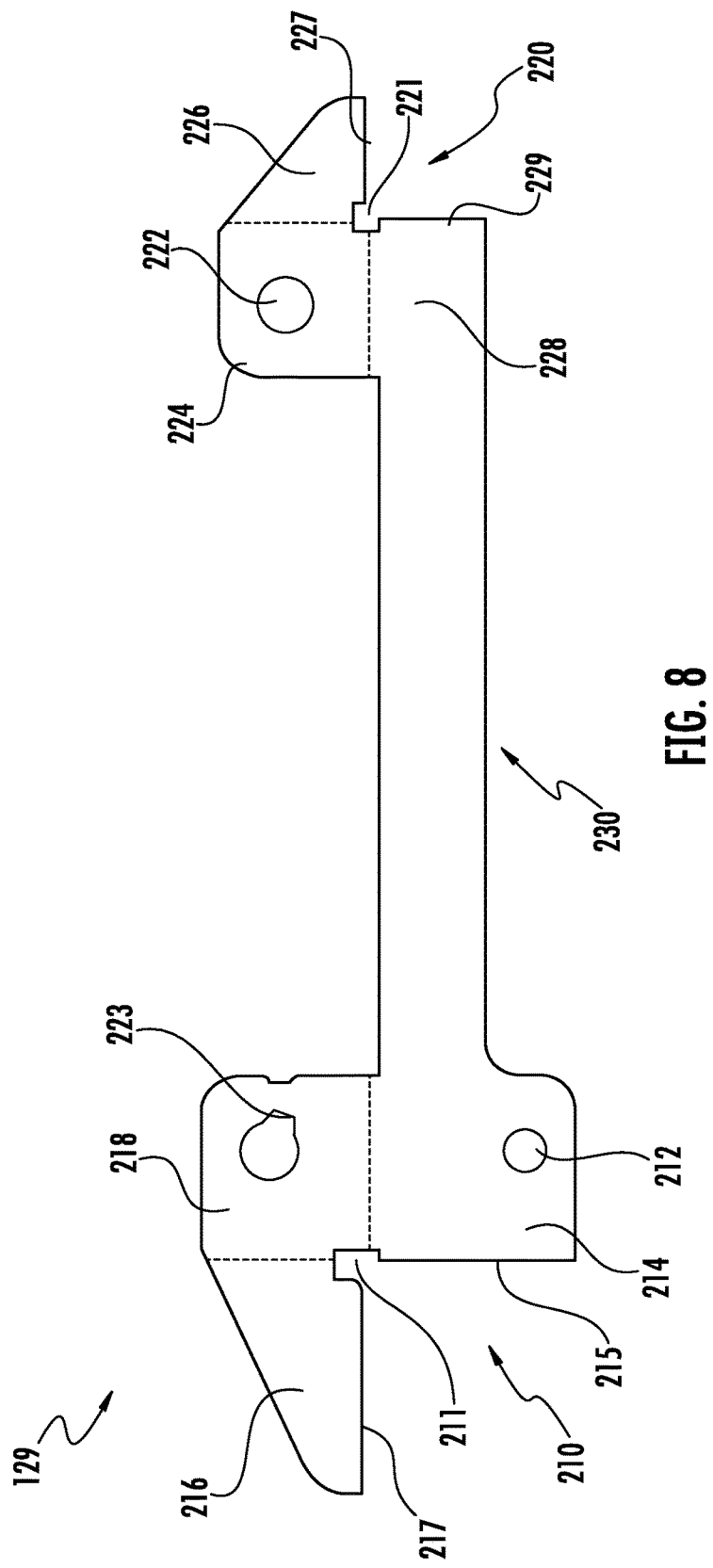
FIG. 8 illustrates a plan view of a flat form from which a deformable seat bracket may be formed according to an example embodiment of the present invention.

FIG. 8 illustrates a flat pattern of a deformable seat bracket according to one example embodiment of the present invention. The deformable bracket of an example embodiment may be configured to be formed from a single piece of stock, such as to keep manufacturing costs low and/or reduce the number of welds required to produce the deformable seat bracket. Further, this simplification of manufacturing may improve the consistency of the deformable bracket and its performance characteristics. The illustrated flat pattern of FIG. 8 depicts the first portion 210, the second portion 220, and the third portion 230. The first portion 210 is depicted including the first structural portion 214 and the hole there through 212. The first portion further includes the first support portion 216 and fracture propagation region 223 within the second fastener receiving portion. The depicted second portion 220 includes the lateral portion 228, the second structural member 224, and the second support portion 226. Both the first portion 210 and the second portion 220 include recesses 211 and 221 to facilitate the bends necessary to form the seat bracket 129.

Dashed lines are illustrated between the first structural portion 214 and the second fastener receiving portion 218 and between the second fastener receiving portion 218 and the first support portion 216. These dashed lines depict the locations of right-angle bends to form the seat bracket 129 into shape. The second fastener receiving portion 218 and the first support portion 216 are configured to be bent to define planes substantially orthogonal to one another and the first structural portion 214. In such a position, an edge 217 of the first support portion 216 and an edge of the first structural portion are configured to be welded along their lengths.

Dashed lines are also illustrated between the lateral portion 228 and the second structural member 224, and between the second structural member 224 and the second support portion 226 where the bracket form is configured to be bent at right angles. These bends result in the lateral portion 228, the second structural member 224, and the second support portion 226 to define planes substantially orthogonal to one another. In the formed position, an edge 227 of the second support portion 226 and an edge of the lateral portion 228 are configured to be welded along their lengths. Optionally, the first support 216 portion could be formed at the edge 215 of the first structural portion 214, and the second support portion 226 could be formed at the edge 229 of the lateral portion 228, and a the first support portion 216 could be welded to the second fastener receiving portion 218 along the line at which they meet when formed into the bracket, while the second support portion 226 could be welded to the second structural member 224 along the line at which they meet when formed into the bracket. It is appreciated that the illustrated fold lines and edges along which portions are welded can be interchanged without deviating from the configuration of the formed bracket as described herein.

The third portion 230 of the flat-form may be bent proximate the mid-point between the first portion 210 and the second portion 220 to align the holes in the second structural member 224 and the second fastener receiving portion 218. The third portion 230 may be bent, for example, on a mandrel to achieve a specific bend radius and to minimize stress concentration along the length of the third portion. The third portion 230 may be bent after the first portion 210 and the second portion 220 are bent and formed as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A seat bracket comprising:
    a first portion configured to be attached to a structural frame of a vehicle by a first fastener passing there through;
    a second portion configured to be attached to a seat installed in the vehicle by a second fastener passing there through; and
    a third portion attaching the first portion to the second portion,
    wherein the third portion comprises a U-shape, and
    wherein the first portion is configured to receive the second fastener there through.

2. The seat bracket of claim 1, wherein the second portion comprises a hole for the second fastener to pass through, and the first portion comprises a hole for the second fastener to pass through.

3. The seat bracket of claim 2, wherein the first portion defines a fracture propagation region disposed proximate the hole for the second fastener.

4. The seat bracket of claim 2, wherein the bracket is configured to:
    preclude relative motion between the first portion and the second portion in response to a force exerted on the seat along an axis axially aligned with a first axis of the first fastener, perpendicular to a hole in the first portion for the first fastener;
    preclude relative motion between the first portion and the second portion in response to a force exerted on the seat along an axis axially aligned with a second axis of the second fastener, perpendicular to the holes for the second fastener;
    preclude relative motion between the first portion and the second portion in response to a force exerted on the seat in a first direction along a third axis perpendicular to the first axis and the second axis; and
    allow relative motion between the first portion and the second portion in response to a force exerted on the seat above a predetermined amount in a second direction, opposite the first direction, along the third axis.

5. The seat bracket of claim 2, further comprising a collar received through at least one of the hole of the second portion for the second fastener and the hole of the first portion for the second fastener.

6. The seat bracket of claim 1, wherein the second portion is configured to move relative to the first portion toward the third portion in response to a force above a predefined amount.

7. The seat bracket of claim 6, wherein the second fastener is configured to tear through the second portion in response to the second portion moving relative to the first portion toward the third portion.

8. The seat bracket of claim 1, wherein the bracket is configured to allow relative motion between the first portion and the second portion in response to a force exerted on the seat above a predetermined amount in a direction along an axis passing by the first portion and the second portion and through the center of the U-shape of the third portion distal from the first and second portions.

9. The seat bracket of claim 1, wherein the first portion, second portion, and third portion are formed from a single piece of metal.

10. The seat bracket of claim 1, wherein the first portion comprises a structural member configured to be attached to the structural frame and a second fastener receiving portion configured to receive the second fastener there through, wherein the structural member and the second fastener portion are attached to one another and bent orthogonally.

11. The seat bracket of claim 10, wherein the first portion comprises a support portion connecting the structural member and the second fastener receiving portion.

12. A seat bracket comprising:
    a first portion configured to be attached to a structural frame of a vehicle by a first fastener passing there through;
    a second portion configured to be attached to a seat installed in the vehicle by a second fastener passing there through; and
    a third portion attaching the first portion and the second portion, wherein the third portion comprises a U-shape;
    wherein the second portion is configured to move, relative to the first portion, in response to a force exerted on the seat above a predefined amount in a first direction along an axis that is perpendicular to a major axis of the first fastener and perpendicular to a major axis of the second fastener.

13. The seat bracket of claim 12, wherein the second portion is configured to remain substantially stationary, relative to the first portion, in response to a force exerted on the seat above the predefined amount in a second direction, opposite the first direction.

14. The seat bracket of claim 13, wherein the first portion is configured to be attached to the seat by the second fastener passing through the second portion and the first portion.

15. The seat bracket of claim 14, wherein the second fastener is configured to tear through the first portion in response to the second portion moving relative to the first portion in response to the force exerted on the seat above a predefined amount in the first direction.

16. The seat bracket of claim 15, further comprising a fracture propagation region in the first portion disposed proximate a hole through the first portion into which the second fastener is received.

17. The seat bracket of claim 16, wherein the first portion is configured to tear beginning at the fracture propagation region.

18. The seat bracket of claim 12, wherein the first portion is configured to receive the first fastener through a first hole along a first axis, wherein the second portion is configured to receive the second fastener through a second hole along a second axis, and wherein the first axis and the second axis are perpendicular.

\* \* \* \* \*